(12) United States Patent
Grion (10) Patent No.: US 10,310,111 B2
(45) Date of Patent: Jun. 4, 2019

(54) WAVE-FIELDS SEPARATION FOR SEISMIC RECORDERS DISTRIBUTED AT NON-FLAT RECORDING SURFACES

(71) Applicant: CGGVERITAS SERVICES SA, Massy Cedex (FR)

(72) Inventor: Sergio Grion, Horley (GB)

(73) Assignee: CGG SERVICES SAS, Massy (FR)

( * ) Notice: Subject to any disclaimer, the term of this patent is extended or adjusted under 35 U.S.C. 154(b) by 1871 days.

(21) Appl. No.: 13/670,900

(22) Filed: Nov. 7, 2012

(65) Prior Publication Data
US 2013/0155811 A1   Jun. 20, 2013

(30) Foreign Application Priority Data
Dec. 15, 2011  (FR) ..................... 11 61720

(51) Int. Cl.
  *G01V 1/38* (2006.01)
  *G01V 1/28* (2006.01)
  *G01V 1/36* (2006.01)

(52) U.S. Cl.
  CPC .......... *G01V 1/28* (2013.01); *G01V 1/368* (2013.01); *G01V 1/38* (2013.01); *G01V 1/3852* (2013.01); *G01V 2210/56* (2013.01)

(58) Field of Classification Search
  USPC ........................................... 367/24
  See application file for complete search history.

(56) References Cited

U.S. PATENT DOCUMENTS

| 6,625,083 B2 | 9/2003 | Vandenbroucke |
| 7,660,191 B2 * | 2/2010 | Robertsson ............. G01V 1/38 367/16 |

(Continued)

FOREIGN PATENT DOCUMENTS

| AU | 2009212893 A1 * | 4/2010 |
| EP | 1 217 390 A1 | 6/2002 |

(Continued)

OTHER PUBLICATIONS

Palacharla, Gopal. "Migration from a non-flat datum via reverse-time extrapolation." Stanford Exploration Project, Report 84. May 9, 2001. pp. 1-50.*

(Continued)

*Primary Examiner* — Isam A Alsomiri
*Assistant Examiner* — Jonathan D Armstrong
(74) *Attorney, Agent, or Firm* — Patent Portfolio Builders PLLC (57) ABSTRACT

Apparatus, computer instructions and method for separating up-going and down-going wave fields (U, D) from seismic data recorded within or beneath a body of water, or in general below the surface of the earth. The method includes a step of receiving seismic data ($P_o$, $Z_o$) recorded in the time-space domain with seismic recorders distributed on a first datum, wherein the first datum is non-flat; a step of establishing a mathematical relation between transformed seismic data (P, Z) and the up-going and down-going wave fields (U, D) on a second planar datum; and a step of solving with an inversion procedure, run on a processor, the mathematical relation to obtain the up-going and down-going wave fields (U, D) for the second datum. The second datum is different from the first datum.

20 Claims, 7 Drawing Sheets

(56) References Cited

U.S. PATENT DOCUMENTS

| | | | | |
|---|---|---|---|---|
| 7,706,211 | B2* | 4/2010 | Bakulin | G01V 1/303 367/38 |
| 7,710,821 | B2* | 5/2010 | Robertsson | G01V 1/36 367/24 |
| 7,751,279 | B2* | 7/2010 | Zhao | G01V 1/42 367/25 |
| 8,077,543 | B2* | 12/2011 | van Manen | G01V 1/36 367/21 |
| 8,077,544 | B2* | 12/2011 | Dragoset, Jr. | G01V 1/36 367/21 |
| 8,275,551 | B2* | 9/2012 | Bakulin | G01V 1/36 702/11 |
| 8,467,265 | B2* | 6/2013 | van Manen | G01V 1/364 367/20 |
| 8,693,281 | B2* | 4/2014 | Kragh | G01V 1/3808 367/15 |
| 8,937,848 | B2* | 1/2015 | Wang | G01V 1/364 367/21 |
| 8,971,149 | B2* | 3/2015 | Grion | G01V 1/28 367/24 |
| 9,110,191 | B2* | 8/2015 | Dragoset, Jr. | G01V 1/36 |
| 9,134,445 | B2* | 9/2015 | Kragh | G01V 1/36 |
| 9,176,249 | B2* | 11/2015 | Poole | G01V 1/36 |
| 9,291,737 | B2* | 3/2016 | Sollner | G01V 1/325 |
| 9,423,518 | B2* | 8/2016 | Day | G01V 1/364 |
| 9,435,905 | B2* | 9/2016 | Wang | G01V 1/364 |
| 9,477,001 | B2* | 10/2016 | van Groenestijn | G01V 1/368 |
| 9,535,181 | B2* | 1/2017 | Poole | G01V 1/36 |
| 9,684,085 | B2* | 6/2017 | Grion | G01V 1/308 |
| 9,784,870 | B2* | 10/2017 | Poole | G01V 1/364 |
| 9,791,581 | B2* | 10/2017 | Siliqi | G01V 1/362 |
| 9,864,084 | B2* | 1/2018 | Poole | G01V 1/36 |
| 10,012,747 | B2* | 7/2018 | Wang | G01V 1/364 |
| 10,054,704 | B2* | 8/2018 | Bisley | G01V 1/36 |
| 2010/0091610 | A1 | 4/2010 | Sollner | |

FOREIGN PATENT DOCUMENTS

| | | | |
|---|---|---|---|
| EP | 2 177 933 A2 | 4/2010 | |
| GB | 2 405 473 A | 3/2005 | |
| GB | 2405473 A * | 3/2005 | G01V 1/36 |
| WO | 2006/037815 A1 | 4/2006 | |

OTHER PUBLICATIONS

Fortuin, Leonard. "Survey of literature on reflection and scattering of sound waves at the sea surface." The Journal of the Acoustical Society of America 47.5B (1970): 1209-1228.*

Sabri, M., and Willem Steenaart. "An approach to band-limited signal extrapolation: the extrapolation matrix." Circuits and Systems, IEEE Transactions on 25.2 (1978): 74-78.*

McMechan, George A., and H. W. Chen. "Implicit static corrections in prestack migration of common-source data." Geophysics 55.6 (1990): 757-760.*

Wapenaar, C. P. A., H. L. H. Cox, and A. J. Berkhout. "Elastic Redatuming of Multicomponent Seismic DATA1." Geophysical prospecting 40.4 (1992): 465-482.*

Gerard Schuster. Static Corrections to Remove Elevation and Near-Surface Heterogeneities. URL: [http://utam.gg.utah.edu/stanford/node17.html]. 1998.*

Bancroft-Crewes, John C. "A visualization of the relationship between Kirchhoff migration and seismic inversion.". 2002.*

Gerard Schuster. Equations for Redatuming Seismic Data by an Asymptotic Inverse. URL: [utam.gg.utah.edu/tomo05/05_ann/PDF/jerry_inter_GRT_single.pdf]. Feb. 6, 2006.*

Center for Subsurface Imaging. Chapter 10 Phase Shift Migration. URL: [csim.kaust.edu.sa/files/Short.Courses/BP.2011/PPT/chphasemig.pdf]. 2006.*

Stanford Exploration Project. Chapter 2, Why time and space?. URL: [sepwww.stanford.edu/sep/prof/iei2/40_02.pdf]. 2008.*

IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.*

Ziolkowski, Anton, David Taylor, and Rodney Johnston. "Multiple wavefields: separating incident from scattered, up from down, and primaries from multiples." SEG Technical Program Expanded Abstracts 1998. Society of Exploration Geophysicists, 1998. 1499-1502.*

Ziolkowski, A. M., D. B. Taylor, and R. G. K. Johnston. "Marine seismic wavefield measurement to remove sea-surface multiples." Geophysical Prospecting 47.6 (1999): 841-870.*

Lasse Amundsen, "Wavenumber-Based Filtering of Marine Point Source Data", Geophysics, Sep. 1993, pp. 1104-1107.

Vaughn Ball et al., "Dual-sensor summation of noisy ocean-bottom data", SEG Annual Meeting Nov. 10-15, 1996, Denver, Colorado, pp. 28-31.

Fred Barr, "Dual sensor OBC technology" The Leading Edge, Houston, Texas, Jan. 1997.

Robertsson et al., "On the use of multicomponent streamer recordings for reconstruction of pressure wavefields in the crossline direction", Geophysics vol. 73, No. 5, Sep.-Oct. 2008, pp. A45-A49.

K.M. Schalkwijk et al., "Adaptive decomposition of multicomponent ocean-bottom seismic data into downgoing and upgoing P and S waves", Geophysic, vol. 68, No. 3, May-Jun. 2003, pp. 1091-1102.

Hocine Tabti et al., "Conventional versus dual sensor streamer deghosting: a case study from a Haltenbanken survey", First Break, vol. 27, Nov. 2009, pp. 137-141.

C.P.A. Wapenaar et al., "Elastic redatuming of multicomponent seismic data", Geophysical Prospecting 40, presented May-Jun. 1990, pp. 465-482.

French Preliminary Search issued in related French Application No. 1161720 dated Sep. 21, 2012.

* cited by examiner

WAVE-FIELDS SEPARATION FOR SEISMIC RECORDERS DISTRIBUTED AT NON-FLAT RECORDING SURFACES

BACKGROUND

Technical Field

Embodiments of the subject matter disclosed herein generally relate to methods and systems and, more particularly, to mechanisms and techniques for separating up-going and down-going wave fields from seismic data recorded underwater or under the surface of the earth by a seismic receiver.

Discussion of the Background

Offshore and onshore drilling is an expensive process. Thus, those engaged in such a costly undertaking invest substantially in geophysical surveys to more accurately decide where to drill in order to avoid a well with no or non-commercial quantities of hydrocarbons.

Marine and land seismic data acquisition and processing generate an image of the geophysical structure (subsurface). While this image/profile does not provide a precise location for oil and gas reservoirs, it suggests, to those trained in the field, the presence or absence of oil and/or gas reservoirs. Thus, providing a high-resolution image of the subsurface is an ongoing process for the exploration of natural resources, including, among others, oil and/or gas.

Figure 1:
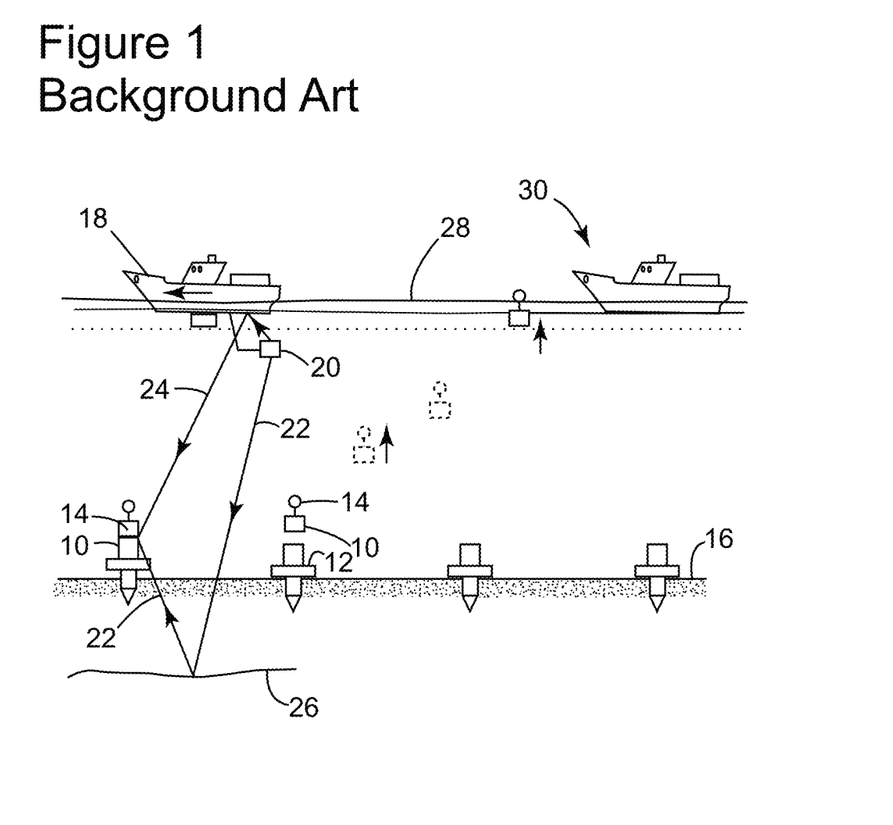
FIG. 1 is a schematic diagram of a conventional seismic data acquisition system having plural seismic receivers provided at the ocean bottom.

For example, marine systems for the recording of seismic waves are based on towed streamers or on seafloor-deployed cables or nodes. An example of traditional marine system for recording seismic waves at the seafloor is illustrated in FIG. 1 and this system is described in European Patent No. EP 1 217 390, the entire content of which is incorporated herein by reference. In this document, plural seismic receivers 10 are removably attached to a pedestal 12 together with a memory device 14. Multiple such receivers are deployed on the bottom 16 of the ocean. A source vessel 18 tows a seismic source 20 that is configured to emit seismic waves 22 and 24. Seismic waves 22 propagate downward, toward the ocean bottom 16. After being reflected from a structure 26, the seismic wave (primary) is recorded (as a trace) by the seismic receiver 10, while the seismic waves 24 reflected at the water surface 28 are detected by the receivers 10 at a later time. Since the interface between the water and air is well approximated as a quasi-perfect reflector (i.e., the water surface acts as a mirror for the acoustic or seismic waves), the reflected wave 24 travels back toward the receiver 10. This reflected wave is traditionally referred to as a ghost wave because this wave is due to a spurious reflection. The ghosts are also recorded by the receivers 10, but with a different polarization and a time lag relative to the primary wave 22. As the primary wave 22 moves in an upward direction toward the receiver 10, this wave is sometimes called an up-going wave-field, and as the ghost 24 moves in a downward direction toward the receiver 10, this wave is sometimes called a down-going wave-field.

FIG. 1 also shows the receiver 10 being configured to detach from the pedestal 12 and to rise to the water surface 28 to be retrieved by a collecting boat 30. Based on the data collected by the receiver 10, an image of the subsurface is generated by further analyses.

As discussed above, every arrival of a marine seismic wave at receiver 10 is accompanied by a ghost reflection. The same applies for every arrival of a land seismic wave recorded by a buried receiver. In other words, ghost arrivals trail their primary arrival and are generated when an upward traveling wave is recorded a first time on submerged equipment before being reflected at the surface-air contact. Primary and ghost (receiver-side ghost and not the source-side ghost) signals are also commonly referred to as up-going and down-going wave-fields.

The time delay between an event and its ghost depends entirely upon the depth of the receiver 10 and the wave velocity in water (this can be measured and is considered to be approximately 1500 m/s). It can be only a few milliseconds for towed streamer data (depths of less than 15 meters) or up to hundreds of milliseconds for deep Ocean Bottom Cable (OBC) and Ocean Bottom Node (OBN) acquisitions. The degenerative effect that the ghost arrival has on seismic bandwidth and resolution is known. In essence, interference between primary and ghost arrivals causes notches or gaps in the frequency content, and these notches cannot be removed without the combined use of advanced acquisition and processing techniques.

Such advanced processing techniques include wave-field separation or wave-field decomposition or deghosting. These techniques require advanced data acquisition, i.e., multi-component marine acquisition. Multi-component marine acquisition uses receivers that are capable of measuring at least two different parameters, for example, water pressure (recorded with a hydrophone) and water particle acceleration or velocity (recorded with a geophone or accelerometer). Thus, multi-component marine acquisitions deliver, besides a pressure recording P, at least a vertical particle velocity (or acceleration) component Z.

A sensitive data-processing step for marine multi-component recordings is pre-stack wave-field separation. Wave-field separation allows the separation of the recorded wave-field into its individual parts: up-going and down-going waves. Various techniques are known in the field for wave-field separation, e.g., Amundsen, 1993, *Wavenumber-based filtering of marine point source data*, Geophysics; or Ball and Corrigan, 1996, *Dual-sensor summation of noisy ocean-bottom data*, SEG Ann. Mtg.; or Schalkwijk et al., 2003, *Adaptive decomposition of multi-component ocean-bottom seismic data into downgoing and upgoing P and S waves*, Geophysics, the entire contents of which are incorporated herein by reference.

Regardless of the type of separation and of the details of the algorithm used, current separation algorithms assume that the recording surface is a planar surface. However, the ocean bottom is a non-planar acquisition surface. Alternatively, the towed-streamer depth may vary along its length, or buried receivers may be deployed at variable depth. Thus, for these situations, the planar surface assumption fails, and the collected data may generate spurious effects in the final image unless it is corrected.

Accordingly, it would be desirable to provide systems and methods that avoid the aforedescribed problems and drawbacks, e.g., take into account the non-flat acquisition surface.

SUMMARY

According to an exemplary embodiment, there is a method for separating up-going and down-going wave fields (U, D) in seismic data related to a subsurface of a body of water, or to a subsurface of a body of rock. The method includes a step of receiving seismic data ($P_o$, $Z_o$) recorded in the time-space domain with seismic recorders distributed on a first datum, wherein the first datum is non-flat; a step of establishing a mathematical relation between transformed seismic data (P, Z) and the up-going and down-going wave fields (U, D) on a second planar datum; and a step of solving with an inversion procedure, run on a processor, the mathematical relation to obtain the up-going and down-going wave fields (U, D) for the second datum. The second datum is different from the first datum.

According to another exemplary embodiment, there is a computing device for separating up-going and down-going wave fields (U, D) in seismic data related to a subsurface of a body of water or to a subsurface of a body of rock. The computing device includes an interface configured to receive seismic data ($P_o$, $Z_o$) recorded in the time-space domain with seismic recorders distributed on a first datum, wherein the first datum is non-flat; and a processor connected to the interface. The processor is configured to receive a mathematical relation between transformed seismic data (P, Z) and the up-going and down-going wave fields (U, D) on a second planar datum, and solve with an inversion procedure the mathematical relation to obtain the up-going and down-going wave fields (U, D) for the second datum. The second datum is different from the first datum.

According to still another exemplary embodiment, there is a computer readable medium including computer executable instructions, wherein the instructions, when executed by a processor, implement instructions for separating up-going and down-going wave fields (U, D) in seismic data related to a subsurface of a body of water or to a subsurface of a body of rock. The instructions include receiving seismic data ($P_o$, $Z_o$) recorded in the time-space domain with seismic recorders distributed on a first datum, wherein the first datum is non-flat; establishing a mathematical relation between transformed seismic data (P, Z) and the up-going and down-going wave fields (U, D) on a second planar datum; and solving with an inversion procedure, run on a processor, the mathematical relation to obtain the up-going and down-going wave fields (U, D) for the second datum. The second datum is different from the first datum.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of deghosting algorithms for separating up-going and down-going wave-fields that are recorded by plural seismic receivers provided on the ocean bottom at different depths relative to the surface of the water. However, the embodiments to be discussed next are not limited to receivers placed on the ocean bottom but may also be applied to streamers that have the receiver placed at different depths or to receivers that are buried in land below the earth's surface at different depths.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, a novel method for separating up- and down-going components includes a first step (i) of determining equations relating the desired separation results on a planar acquisition datum to the available multi-component recordings. Such equations can be formulated in the f-k (frequency wave-number) domain, in the tau-p domain, or other equivalent domains, or a combination of these domains. These equations involve wave-field extrapolation terms (to be discussed later) and are a function of the corresponding media properties (e.g., sound velocity in water or in rock layers).

The novel method further includes a step (ii) of inverting the equations from step (i) to find the desired separation results as a function of the available recordings. This inversion step can be carried out using a variety of algorithms, for example, analytically or by means of a least-squares inversion. It is noted that the amount of seismic data that is used with the equations and the inversion process require specialized computer software to be implemented on a computing device. As the volume of seismic data that needs to be processed for separating the up-going and down-going components is large, it is impractical, if not impossible, for a human being to do all these calculations in his or her mind.

Figure 2:
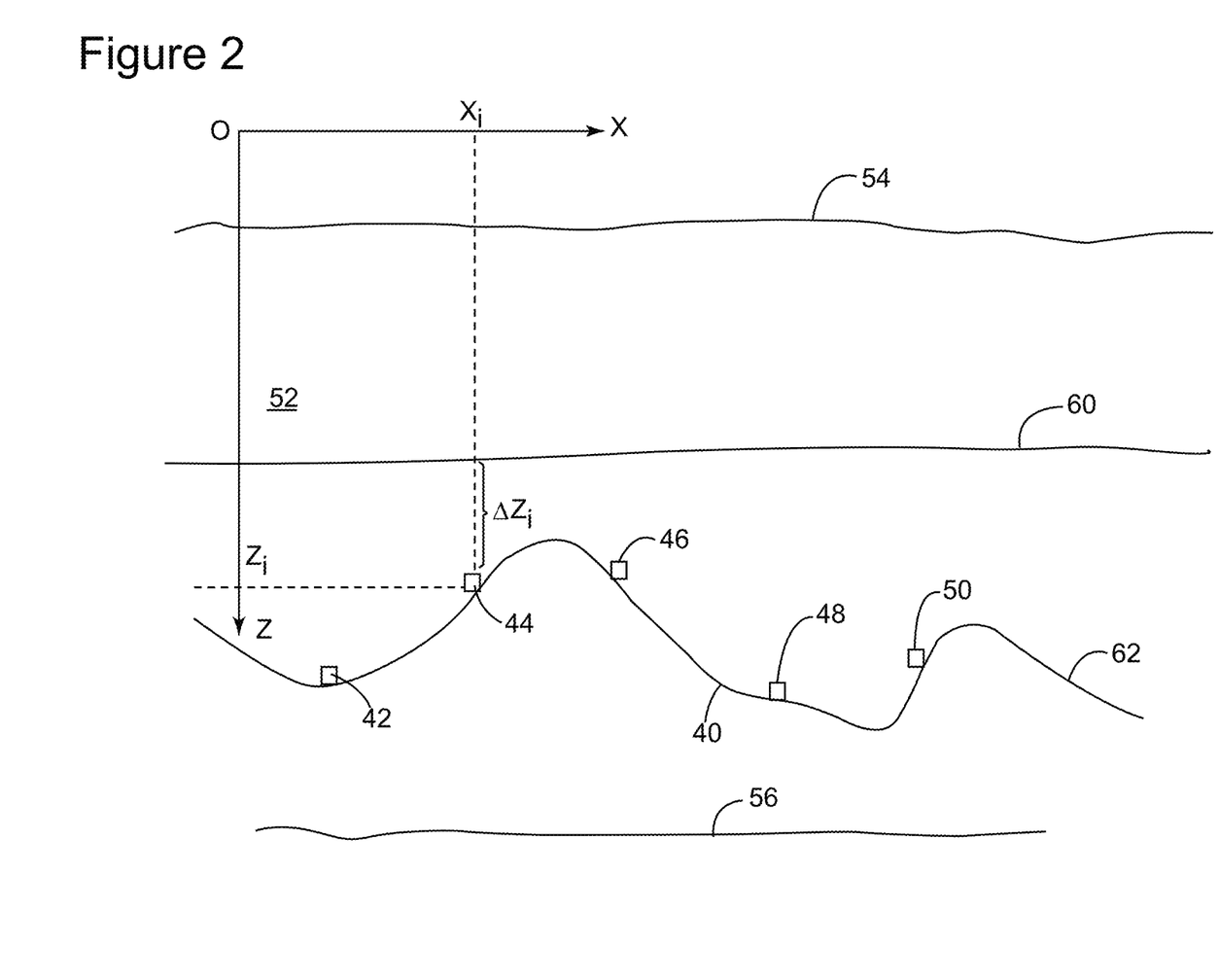
FIG. 2 is a schematic diagram illustrating plural seismic receivers provided on a non-flat datum and a flat datum at which up- and down-going wave-fields are calculated according to an exemplary embodiment.

One example of a non-flat and non-planar acquisition surface is an ocean-bottom acquisition system in which the nodes are deployed on a seabed with a rough topography. FIG. 2 illustrates a non-flat ocean bottom 40 on which plural receivers 42-50 have been distributed. A body of water 52 is located above the receivers and has a water/air interface 54. A structure 56 is buried below the ocean bottom 40 and it is desired to be imaged with the novel method. Another example of a non-flat acquisition surface is the situation when towed-streamer depths vary along their lengths, or when receivers are buried beneath the earth's surface at variable depths.

Considering that each receiver 42-50 is configured to record a water pressure P and a particle velocity Z along a z-axis, a possible example of equations (mathematical relation) relating (i) the up-going U and down-going D waves at a planar (and also flat) datum 60 and (ii) the recorded and transformed P and Z seismic data on a non-flat datum 62 is given by:

$$P(x_i, z_i, \omega) = \sum_k (e^{+jk_z\Delta z_i} U(\omega, k) + e^{-jk_z\Delta z_i} D(\omega, k)) \frac{1}{N_k} e^{+j2\pi k x_i} \quad (1)$$

and $$Z(x_i, z_i, \omega) = \sum_k \frac{k_z}{\omega\rho} (e^{+jk_z\Delta z_i} U(\omega, k) - e^{-jk_z\Delta z_i} D(\omega, k)) \frac{1}{N_k} e^{+j2\pi k x_i}. \quad (2)$$

It is noted that the original seismic data $P_o$ and $Z_o$ is a function of the position $x_i$ and $z_i$ of each receiver 42-50 and also a time t at which the data is recorded. For simplicity, the $y_i$ component is considered to be zero in the example shown in FIG. 2. However, the method is applicable for all three spatial components of the position of the receivers. Further, it is noted that the method is also applicable to a situation in which the seismic data is recorded with only one-component receivers, i.e., $P_o$ or $Z_o$ or other component. In this situation, an equation relating the recorded component to the up-going wavefield on a flat datum can be derived and inverted. The inversion result might, in this case, contain noise due to the presence of receiver ghost notches. However, this noise can be effectively reduced or removed by the process of stacking or using traditional noise attenuation and signal enhancement techniques.

The original seismic data $P_o$ and $Z_o$ is transformed (from the time-space domain), in this example, with a temporal Fast Fourier transformation (FFT) so that the time component t is now an angular frequency component $\omega$. Thus, the P and Z components in equations (1) and (2) are the temporal FFT of $P_o$ and $Z_o$. Further, it is noted that the U and D components in equations (1) and (2) are written in the f-k domain (with f being the frequency corresponding to the angular frequency $\omega$, k being the horizontal wave-number and $k_z$ being the vertical wave-number) and these are the up-going and down-going wave-fields desired to be calculated. As noted above, the f-k domain is one possible transformation. Other transformation or transformations may be used.

The vertical distance $\Delta z_i$ in equations (1) and (2) is the depth difference between the planar datum 60 and the non-planar datum 62 at receiver i. The density of the water is represented by $\rho$, and $N_k$ is a normalization factor related to the number of receivers at the ocean bottom. The terms $e^{j2\pi k x_i}$ present in both equations (1) and (2) are related to a spatial inverse FFT that transforms the wave-numbers k to the spatial coordinates of the sensors.

Wave-field extrapolators for the up-going and down-going wave-fields are also present in equations (1) and (2). In fact, the wave-field extrapolators can be found in the equations relating the P and Z components to the U and D components irrespective of the transformation domain employed. For the present exemplary embodiment, the wave-field extrapolators are given by $e^{\pm jk_z \Delta z_i}$. The wave-field extrapolators have opposite signs for the U and D components, and they depend from the vertical wave-number and the depth difference between the planar datum 60 and the non-planar datum 62 at receiver i. The wavefield extrapolators in this example apply to acoustic propagation with a constant velocity. The extension to the situation of variable velocity is well known in the field of seismic data processing. It is noted that the planar datum 60 at which the U and D fields are calculated can be above or below one or more of the receivers 42-62. The embodiment shown in FIG. 2 illustrates the planar datum 60 above the receivers. Further, it is possible to have the planar datum 60 to have a flat shape. Furthermore, it is possible that the planar datum 60 is above but close to the receivers 42-62.

It is noted that equations (1) and (2) are linear in U and D and, thus, the equations can be inverted using a variety of known algorithms. The details of these algorithms are omitted herein. The novel process discussed above may be implemented in a computing device that is provided with dedicated software for separating the up- and down-going components. The computing device is discussed later with regard to FIG. 9.

Figure 3:
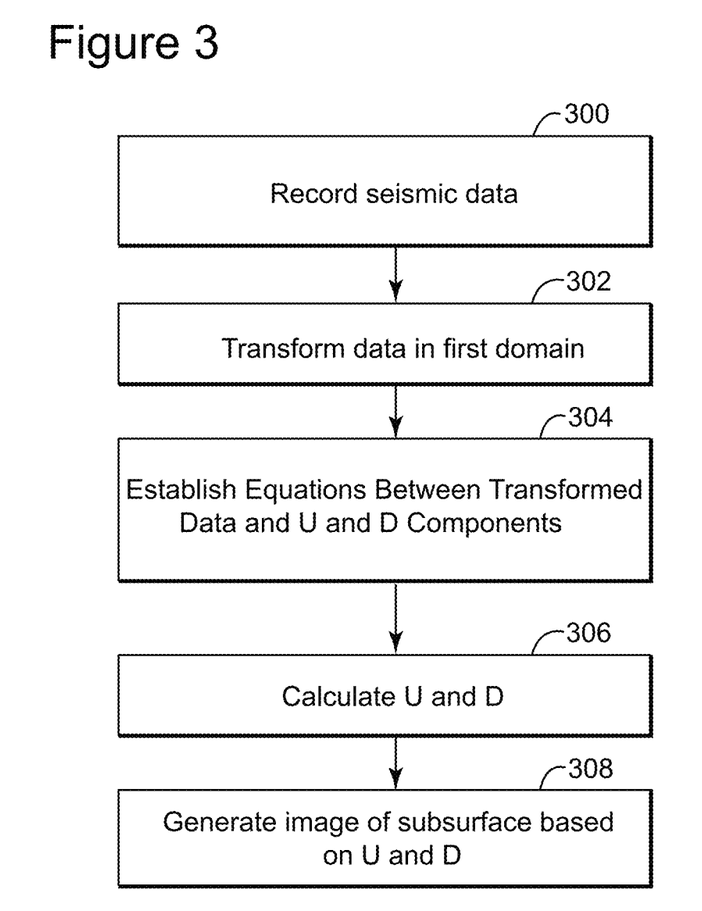
FIG. 3 is a flowchart illustrating a method for separating up- and down-going wave-fields according to an exemplary embodiment.

The novel process is now illustrated based on the flowchart of FIG. 3. In step 300, seismic data (at least two components are recorded, e.g., P and Z) is recorded with corresponding seismic sensors that are provided on the bottom of the ocean. The seismic data is transformed in a desired first domain in step 302. For example, the first domain may be the space-frequency domain. In step 304, equations relating (1) the seismic data transformed in the first domain to (2) up- and down-going wave-fields in a second domain are established. The second domain is different from the first domain and may be, for example, the f-k domain. The up- and down-going wave-fields correspond to a desired planar acquisition datum, while the transformed seismic data corresponds to a non-flat datum. Other domains for the first and second domains are possible.

The equations are inverted in step 306 to find the desired separation results as a function of the available recordings. Then, after various processing steps which are known in the art and not repeated herein, an image of the surveyed subsurface is generated in step 308 based on the separated U and/or D.

Figure 4:
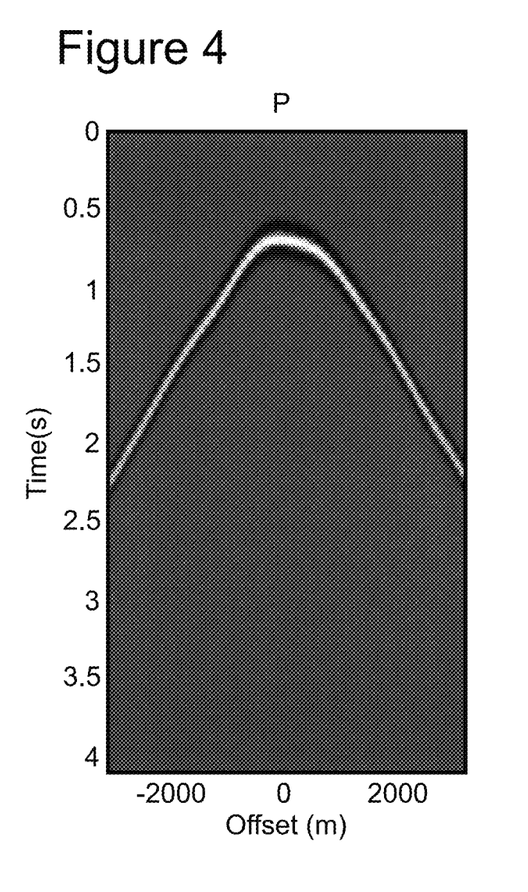
FIGS. 4 and 5 are graphs illustrating synthetic P and Z components according to an exemplary embodiment.
Figure 5:
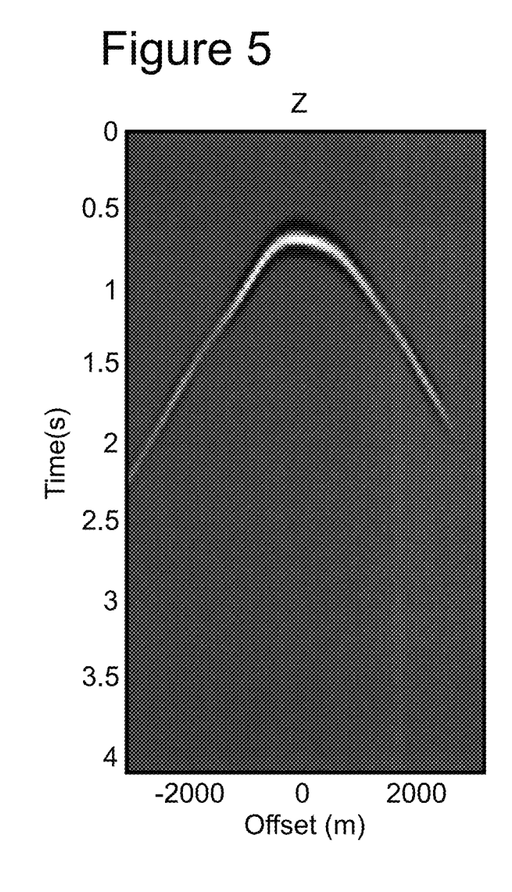
Figure 6:
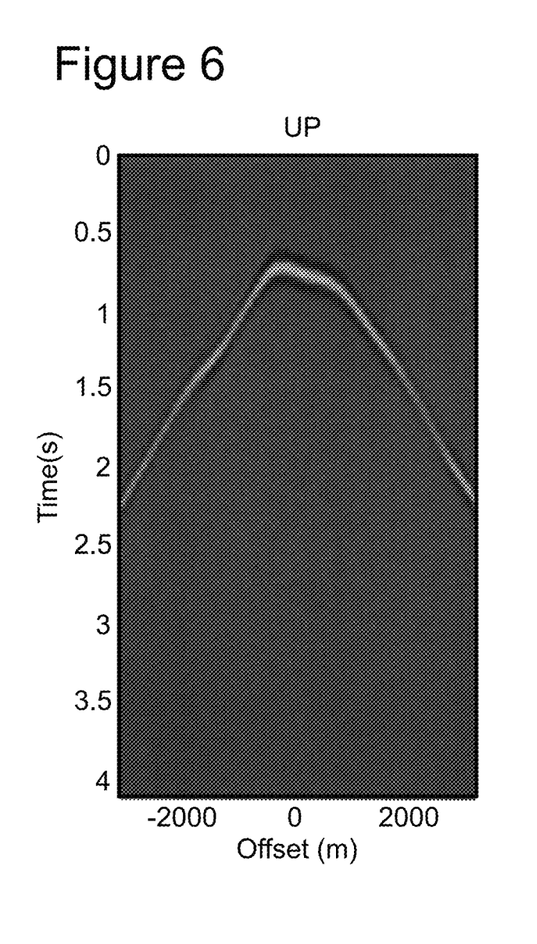
FIGS. 6 and 7 are graphs illustrating up- and down-going wave-fields separated according to an exemplary embodiment.
Figure 7:
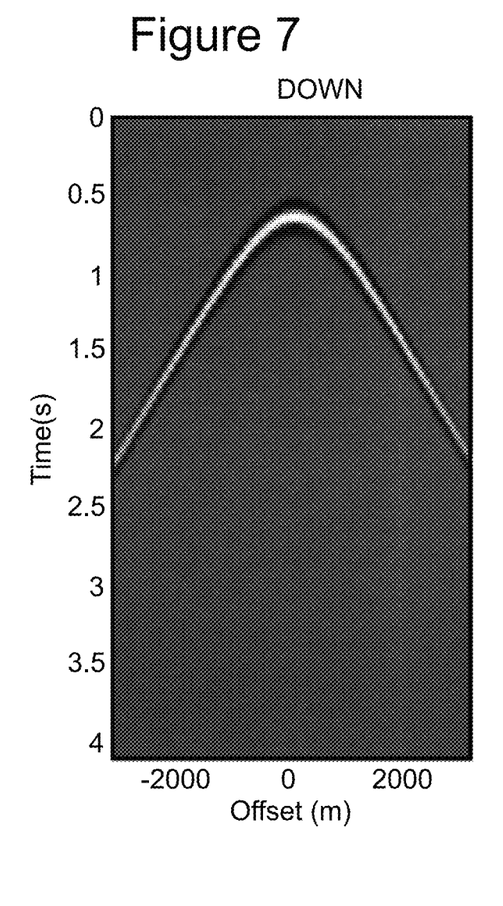

The method noted above is now applied to a set of synthetic P and Z data. The synthetic P data is illustrated in FIG. 4, and the synthetic Z data is illustrated in FIG. 5. The data is generated as being recorded with a certain offset (distance along X axis) from the source and at a time t (on Y axis) from a non-flat acquisition datum. The data shown in FIGS. 4 and 5 is calculated, for example, via acoustic modeling over a half-space and, therefore, it includes only direct arrivals. In this respect, it should be noted that the direct arrival is the most difficult type of event to separate, because its propagation angles are normally wider than for other events. After establishing the equations noted in step 304 in FIG. 3, and solving the up- and down-going components U and D as noted in step 306, the U and D components are illustrated in FIGS. 6 and 7, respectively. FIG. 7 shows that the down-going wave-field is symmetric, while FIG. 6 shows that the up-going wave-field is complex due to the reflection at the non-flat datum (i.e., ocean bottom).

Figure 8:
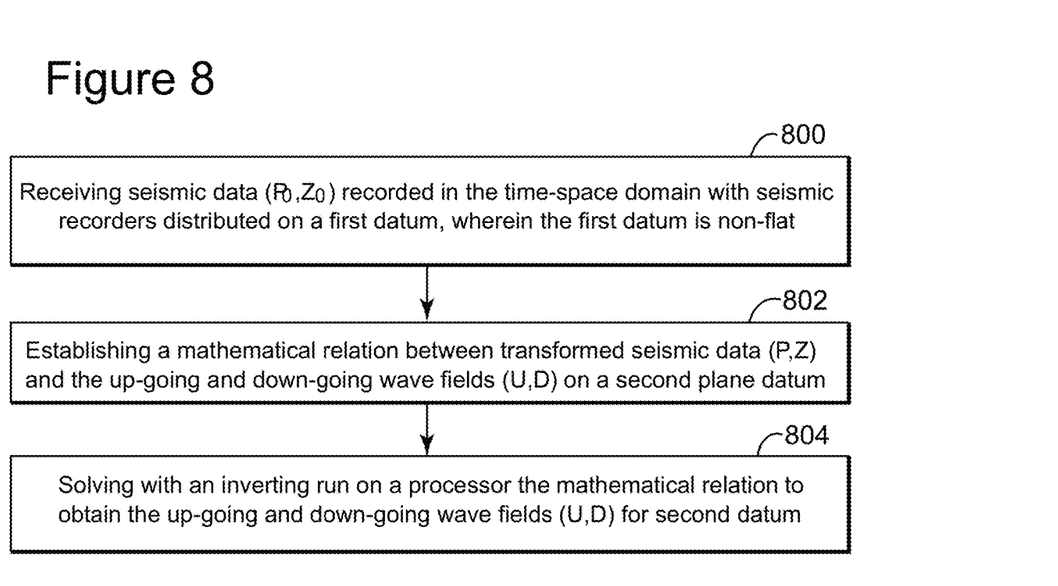
FIG. 8 is a flowchart of another method for separating up- and down-going wave-fields according to an exemplary embodiment.

A method for separating up-going and down-going wave-fields (U, D) from seismic data related to a subsurface of a body of water or rock is now discussed with reference to FIG. 8. The method includes a step 800 of receiving seismic data ($P_o$, $Z_o$) recorded in the time-space domain with seismic recorders distributed on a first datum, wherein the first datum is non-flat; a step 802 of establishing a mathematical relation between transformed seismic data (P, Z) and the up-going and down-going wave-fields (U, D) on a second plane datum; and a step 804 of solving with an inversion procedure, run on a processor, the mathematical relation to obtain the up-going and down-going wave-fields (U, D) for the second datum. The second datum is different from the first datum.

An example of a representative computer system capable of carrying out operations in accordance with the exemplary embodiments discussed above is illustrated in FIG. 9. Hardware, firmware, software or a combination thereof may be used to perform the various steps and operations described herein.

Figure 9:
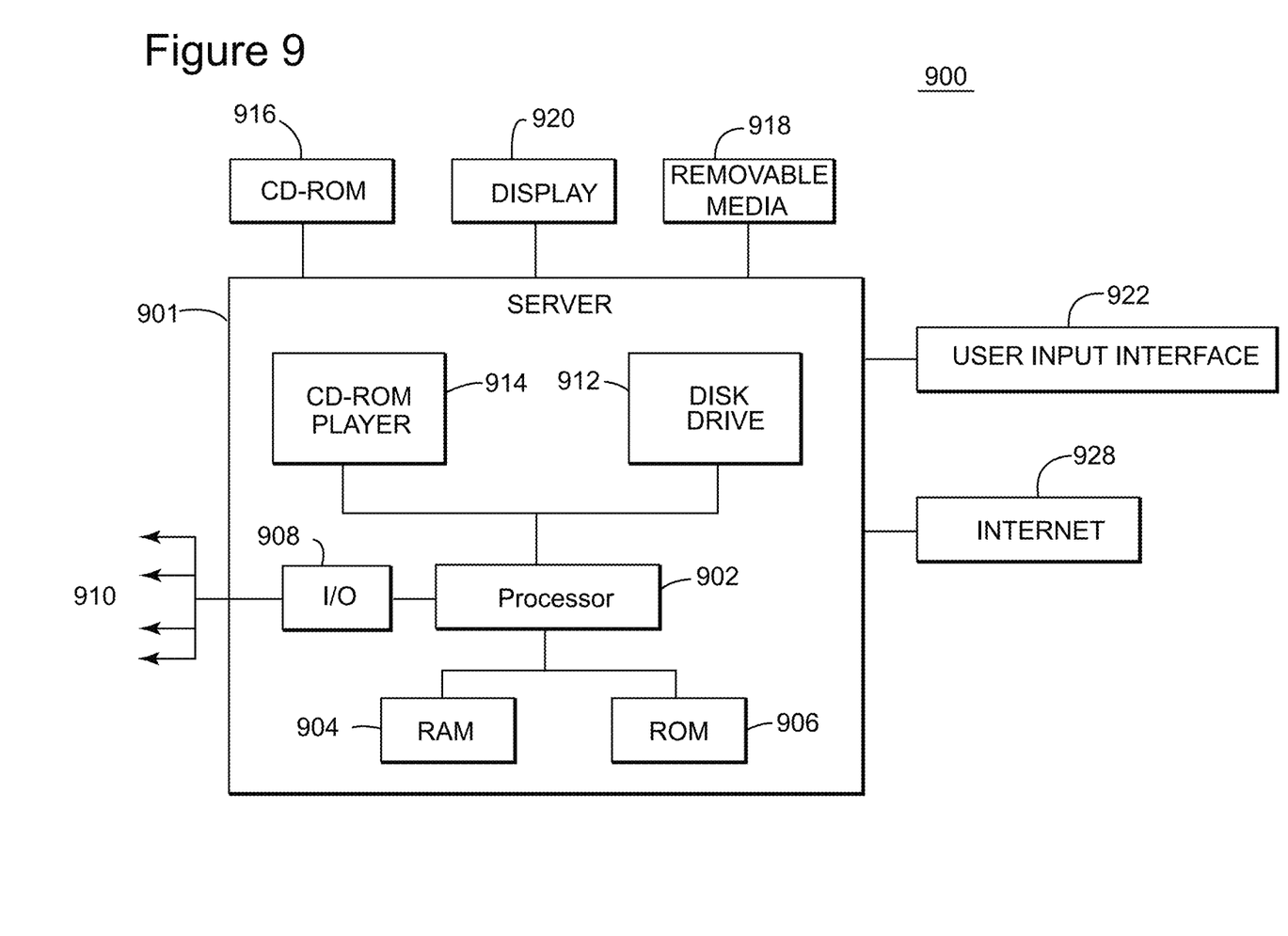
FIG. 9 is a schematic diagram of an apparatus configured to run a separation method according to an exemplary embodiment.

The exemplary computer system 900 suitable for performing the activities described in the exemplary embodiments may include a server 901. Such a server 901 may include a central processor unit (CPU) 902 coupled to a random access memory (RAM) 904 and to a read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as are known in the art, as dictated by software and/or firmware instructions.

The server 901 may also include one or more data storage devices, including hard disk drives 912, CD-ROM drives 914, and other hardware capable of reading and/or storing information such as a DVD, etc. In one embodiment, software for carrying out the above-discussed steps may be stored and distributed on a CD-ROM or DVD 916, removable media 918 or other form of media capable of portably storing information. These storage media may be inserted into, and read by, devices such as the CD-ROM drive 914, the drive 912, etc. The server 901 may be coupled to a display 920, which may be any type of known display or presentation screen, such as LCD or LED displays, plasma displays, cathode ray tubes (CRT), etc. A user input interface 922 is provided, including one or more user interface mechanisms such as a mouse, keyboard, microphone, touch pad, touch screen, voice-recognition system, etc.

The server 901 may be coupled to other computing devices via a network. The server may be part of a larger network configuration as in a global area network (GAN) such as the Internet 928.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices, or magnetic storage devices such as floppy disk or magnetic tape. Other non-limiting examples of computer-readable media include flash-type memories or other known types of memories.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating an image based on separating up-going and down-going wave fields (U, D) in seismic data related to a subsurface of a body of water, or to a subsurface of a body of rock, the method comprising:
   receiving seismic data ($P_o$, $Z_o$) recorded in the time-space domain with seismic recorders distributed on a first datum, wherein the first datum is non-flat;
   transforming the seismic data ($P_0$, $Z_0$) from the time-space domain to transformed seismic data for water pressure (P) and transformed seismic data for particle velocity (Z), in another domain;
   establishing, in the another domain, a mathematical relation that relates (1) the transformed seismic data for water pressure (P) to desired up-going and down-going wave fields (U, D), wherein the transformed seismic data for water pressure (P) is expressed as a first function of the desired up-going and down-going wave fields (U, D) on a second planar datum, and (2) the transformed seismic data for particle velocity (Z) to the desired up-going and down-going wave fields (U, D), wherein the transformed seismic data for particle velocity (Z) is expressed as a second function of the desired up-going and down-going wave fields (U, D) on the second planar datum;
   solving with an inversion procedure, run on a processor, the first and second functions to obtain the desired up-going and down-going wave fields (U, D) for the second datum; and
   generating the image based on at least one of the desired up-going and down-going wave fields (U, D) for the second datum,
   wherein the second datum is different from the first datum,
   wherein each of the first and second functions includes extrapolator operators for extrapolating the desired up-going and down-going wave fields (U, D), respectively, to the second datum.

2. The method of claim 1, wherein
the first and second functions are sums over a horizontal wave-number.

3. The method of claim 1, wherein the step of establishing further comprises:
   using first and second extrapolation operators to multiply the up-going and down-going wave fields (U, D), respectively, in the another domain.

4. The method of claim 1, wherein the another domain is an f-k domain, wherein f is a frequency and k is a wave-number.

5. The method of claim 1, wherein the seismic data is recorded with seismic receivers placed on a bottom of the body of water.

6. The method of claim 1, wherein the seismic data is recorded with seismic receivers placed on streamers within the body of water having variable depths.

7. The method of claim 1, where the seismic data is recorded with seismic receivers placed beneath the earth's surface.

8. The method of claim 1, wherein the seismic data is recorded with multi-component seismic receivers.

9. The method of claim 1, wherein the second datum is flat.

10. A computing device for generating an image based on separating up-going and down-going wave fields (U, D) in seismic data related to a subsurface of a body of water or to a subsurface of a body of rock, the computing device comprising:
an interface configured to receive seismic data ($P_o$, $Z_o$) recorded in the time-space domain with seismic recorders distributed on a first datum, wherein the first datum is non-flat; and
a processor connected to the interface and configured to, transform the seismic data ($P_0$, $Z_0$) from the time-space domain to transformed seismic data for water pressure (P) and transformed seismic data for particle velocity (Z), in another domain,
receive a mathematical relation that relates (1) the transformed seismic data for water pressure (P) to desired up-going and down-going wave fields (U, D), wherein the transformed seismic data for water pressure (P) is expressed as a first function of the desired up-going and down-going wave fields (U, D) on a second planar datum, and (2) the transformed seismic data for particle velocity (Z) to the desired up-going and down-going wave fields (U, D), wherein the transformed seismic data for particle velocity (Z) is expressed as a second function of the desired up-going and down-going wave fields (U, D) on the second planar datum,
solve with an inversion procedure the first and second functions to obtain the up-going and down-going wave fields (U, D) for the second datum, and
generate the image based on at least one of the desired up-going and down-going wave fields (U, D) for the second datum,
wherein the second datum is different from the first datum, and
wherein each of the first and second functions includes extrapolator operators for extrapolating the desired up-going and down-going wave fields (U, D), respectively, to the second datum.

11. The device of claim 10, wherein
the first and second functions are sums over a horizontal wave-number.

12. The device of claim 10, wherein the processor is further configured to:
use first and second extrapolation operators to multiply the up-going and down-going wave fields (U, D), respectively, in the another domain.

13. The device of claim 10, wherein the another domain is an f-k domain, wherein f is a frequency and k is a wave-number.

14. The device of claim 10, wherein the seismic data is recorded with seismic receivers placed on a bottom of the body of water.

15. The device of claim 10, wherein the seismic data is recorded with seismic receivers placed on streamers within the body of water having variable depths.

16. The method of claim 10, where the seismic data is recorded with seismic receivers placed beneath the earth's surface.

17. The device of claim 10, wherein the seismic data is recorded with multi-component seismic receivers.

18. The device of claim 10, wherein the second datum is flat.

19. The device of claim 10, further comprising:
a monitor connected to the processor and configured to display the image of the subsurface that is calculated based on the up-going and down-going wave-fields.

20. A non-transitory computer readable medium including computer executable instructions, wherein the instructions, when executed by a processor, implement instructions for generating an image based on separating up-going and down-going wave fields (U, D) in seismic data related to a subsurface of a body of water or to a subsurface of a body of rock, the instructions comprising:
receiving seismic data ($P_o$, $Z_o$) recorded in the time-space domain with seismic recorders distributed on a first datum, wherein the first datum is non-flat;
transforming the seismic data ($P_0$, $Z_0$) from the time-space domain to transformed seismic data for water pressure (P) and transformed seismic data for particle velocity (Z), in another domain;
establishing, in the another domain, a mathematical relation that relates (1) the transformed seismic data for water pressure (P) to desired up-going and down-going wave fields (U, D), wherein the transformed seismic data for water pressure (P) is expressed as a first function of the desired up-going and down-going wave fields (U, D) on a second planar datum, and (2) the transformed seismic data for particle velocity (Z) to the desired up-going and down-going wave fields (U, D), wherein the transformed seismic data for particle velocity (Z) is expressed as a second function of the desired up-going and down-going wave fields (U, D) on the second planar datum;
solving with an inversion procedure, run on the processor, the first and second functions to obtain the up-going and down-going wave fields (U, D) for the second datum; and
generating the image based on at least one of the desired up-going and down-going wave fields (U, D) for the second datum,
wherein the second datum is different from the first datum, and
wherein each of the first and second functions includes extrapolator operators for extrapolating the desired up-going and down-going wave fields (U, D), respectively, to the second datum.

* * * * *